Oct. 6, 1942. B. LOEWE Re. 22,198

METHOD AND ARRANGEMENT FOR TRANSFERRING TELEPHONE CONVERSATIONS TO OTHER ELECTRICAL DEVICES

Original Filed March 25, 1939

Inventor,

Bernhard Loewe

Reissued Oct. 6, 1942 Re. 22,198

UNITED STATES PATENT OFFICE 22,198

METHOD AND ARRANGEMENT FOR TRANSFERRING TELEPHONE CONVERSATIONS TO OTHER ELECTRICAL DEVICES

Bernhard Loewe, Yonkers, N. Y.

Original No. 2,268,665, dated January 6, 1942, Serial No. 264,083, March 25, 1939. Application for reissue June 13, 1942, Serial No. 448,075

6 Claims. (Cl. 179—1)

My invention relates to a method of transferring telephone conversations and alike to electrical devices which are in no way directly connected with the telephone circuit. More particularly my invention is concerned with arrangements for the practical use of the said method.

I found that there is a considerable dispersed field outside of regular telephone receivers in their neighborhood. The density of this field is not even all around the receiver. Very often it culminates on certain points of the front side of the receiver before the membrane, but sometimes it is stronger on the back side or at a side. It depends upon of what construction the receiver is. On putting one or more suitable formed coils in this field there will be induced considerable tensions in the coils which may be provided with an iron core.

The principal object of my invention is the use of this electrical field for transferring telephone conversations to other electrical devices such as other receivers or amplifiers for reproduction by a loudspeaker or by recording, or for transferring the said conversations to interoffice communication circuits, etc. By using this new method according to my invention no conducting junction has to be made between the telephone circuit and the coil circuit, thus avoiding any disturbance and reaction in the telephone circuit which otherwise may occur.

Another object of my invention is to provide simple inexpensive and efficient arrangements for picking up the dispersed field as described above.

Figure 1:
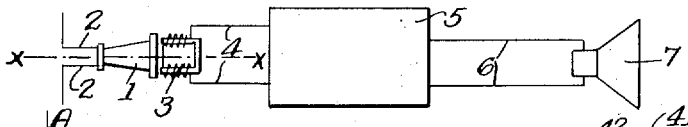
Figure 2:
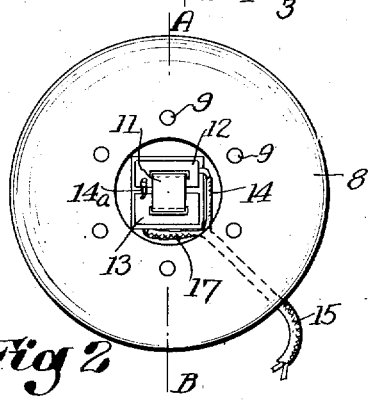
Figure 3:
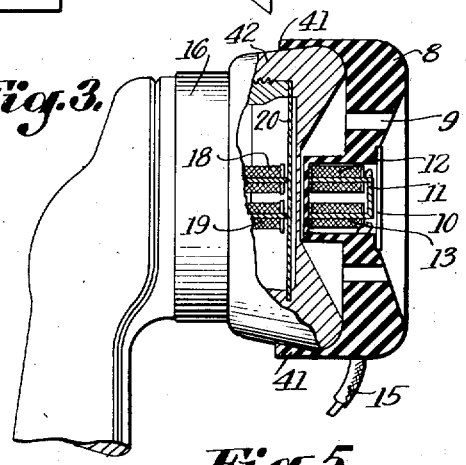
Figure 5:
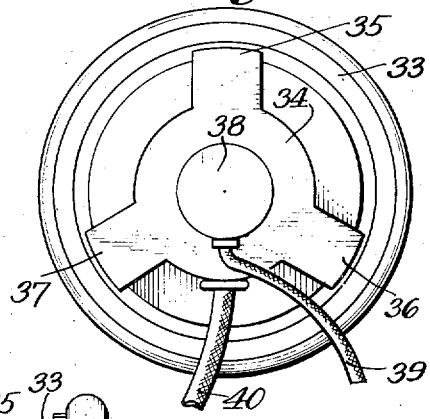
Figure 4:
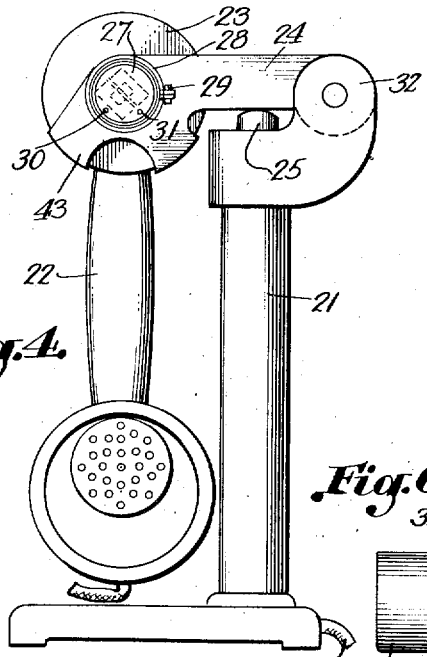
Figure 6:
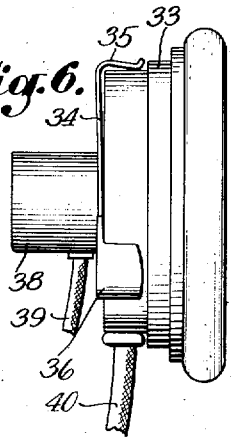

Other objects and advantages of the invention will become apparent from the following description taken in connection with the accompanying drawing in which is:

Fig. 1 a schematic circuit diagram according to the invention;

Fig. 2 a front view of an arrangement according to the invention after removing the cover from the middle part;

Fig. 3 a sectional view across the same arrangement as shown in Fig. 2 taken in the direction A—B, the arrangement being attached to a receiver-part of a so called French telephone, the receiver partly shown in sectional view;

Fig. 4 a side view of another arrangement constructed according to the invention;

Fig. 5 a view to the backside of still another arrangement according to the invention attached to the backside of a single earphone receiver;

Fig. 6 a side view of the same arrangement as shown in Fig. 5.

Referring to Fig. 1 which diagrammatically illustrates one form of circuit according to the invention, a receiver 1 which is connected with an ordinary telephone circuit by the wires 2 is placed opposite a pair of coils 3 in such a position, that the field starting from inside the receiver may induce electrical tensions in the coils 3. The coils are connected to each other in such a way that the tensions are added and the other ends of the windings of the coils are connected by the wires 4 with the input of an amplifier 5, the output of the latter being connected with the speaker 7 by the wires 6. Any suitable amplifier and loudspeaker may be used and very good results are obtained by connecting the wires 4 with the input for phono-pickup of a regular radio set. The coils may be provided with an iron core and the whole arrangement may be turnable around the axis X—X for adjusting the coils in the most efficient position opposite the coils for the receiver. The number of wire windings and the resistance of the coil is largely variable and should be adapted to the connected circuit. 15000 to 20000 windings and a D. C. resistance of 2000 ohms are suitable for most of the purposes.

In Fig. 2 is shown an arrangement of two coils 12 and 13 put over an iron core of U-shape 11 and connected to each other by the wire 14a. The other ends of the coils are connected with the inner conductor 14 and the shielding 17 of a shielded cord 15. The coils are fastened for instance by an insulating wax in a suitable formed cavity of the holder 8. The use of this holder may be best illustrated by the Fig. 3, which is a cross-section of Fig. 2 along the line A—B, and which shows how the holder 8 fits over the receiver part 16 of a so called French telephone. The holder 8 which may be made out of elastic and insulating material such as rubber, but may as well partly or on the whole consist of other material fits with his part 41 over the front part 42 of the receiver 16. The holder 8 may be attached to the receiver in such a position that the axis of the receiver coils 18 and 19 coincides with the axis of the coils 12 and 13. The holder 8 is provided with holes 9 so that the tone starting from the membrane 20 may pass through the holder 8 and any regular telephone conversation can be made even after attaching the arrangement to the telephone receiver. 10 is a cover for the cavity which is brought in place after assembling the whole arrangement.

Another arrangement for more temporary attachment of the coils to the telephone receiver is shown in Fig. 4 in which is 21 a support which holds a lever 24 movable in the joint 32.

The other end of the lever is formed by two hooks 43 for instance a French telephone can be hanged on by his receiver part. This end of the lever furthermore bears a cylindrical arrangement 27 which contains the coils as above described, the terminals for connection the said coils with the circuit being 30 and 31. The cylindrical arrangement 27 fits in a sliced ring 28 so that it may be adjusted by turning and then fixed by pressing the sliced ends of the ring together by means of the screw 29. The weight of the telephone 22 presses the lever against the movable pin 25 which then will be moved downwards. This movement can be used for switching on a circuit attached by the cord 26 for similar purposes. After removing the telephone from the hook a spring presses the pin 25 and the lever upwards and releases the pressure from the switch.

In Fig. 5 is shown the backside of an earphone 33 to which an arrangement 34 is attached by means of the elastic clasps 35, 36, and 37. The cylindrical part 38 contains the coils. The ends of their windings are connected to each other and with the conductors of a shielded cord 39 in the usual manner. 40 is cord connecting the earphone 33 with the telephone circuit.

It will be understood that various modifications within the conception of those skilled in the art are possible without departing from the spirit of my invention or the scope of the claims.

What I claim is:

1. Coupling device for inductive coupling of a telephone circuit with another circuit, comprising two series connected coils mounted on a U-shaped iron core, with the free ends of the coils connected preferably to a shielded cord, and with the core and the coils mounted thereon covered with non-conducting material and tightly sealed in a suitably formed cavity of a holder, the latter being made of elastic, non-conducting material and of such a shape, that its inner part fits over the earpiece of a telephone receiver, holding hereby the core and the coils thereon in proper position to the corresponding parts of the telephone receiver, the outer parts of the holder having the shape of an earpiece, and the wall between the inner and the outer part of the holder having holes.

2. Coupling device for inductive coupling of a telephone circuit with another circuit comprising, in combination, a U-shaped iron core, two coils mounted on said core and connected in series, and an elastic cap adapted to attach said core and coils to the earpiece of a telephone, the bottom of said cap having holes for the passage of sound and having itself the shape of an earpiece with a concave substantially smooth outer surface.

3. Coupling device for inductive coupling of a telephone circuit with another circuit comprising, in combination, a U-shaped iron core, two coils mounted on said core and connected in series, means for securing a desirable distance between said core and between the diaphragm of a telephone and a cap adapted to attach said core and coils elastically to the earpiece of said telephone, said cap having a substantially smooth unobstructed front surface, and all said members being combined into a self contained unit free of relative mobility and relative vibration to each other.

4. Coupling device for inductive coupling of a telephone circuit with another circuit comprising, in combination, a U-shaped iron core, two coils mounted on said core and connected in series, a cap adapted to attach said core and coils elastically to the earpiece of a telephone, and a central boss connected with said cap and forming a casing for said core and said coils, said boss separating said core and coils from the surrounding space in said cap and protecting them from injury from the open end of the cap in the detached condition of the latter.

5. Coupling device for inductive coupling of a telephone circuit with another circuit comprising, in combination, a U-shaped iron core, two coils mounted on said core and connected in series, a cap adapted to attach said core and coils elastically to the earpiece of a telephone, a central boss connected with said cap and forming a casing for said core and said coils, said boss separating said core and coils from the surrounding space in said cap and protecting them from injury from the open end of the cap in the detached condition of the latter, and a cement filling holding said core and coils in place in said boss.

6. Coupling device for inductive coupling of a telephone circuit with another circuit comprising, in combination, a U-shaped iron core, two coils mounted on said core and connected in series, a rubber cap adapted to attach said core and coils elastically to the earpiece of a telephone, and a central rubber boss integral with said cap and forming a casing for said core and said coils, said boss separating said core and coils from the surrounding space in said cap and protecting them from injury from the open end of the cap in the detached condition of the latter.

BERNHARD LOEWE.